United States Patent
Yang et al.

(10) Patent No.: US 9,357,330 B2
(45) Date of Patent: May 31, 2016

(54) METHOD, APPARATUS AND SYSTEM FOR PROCESSING NON-RESOURCE RESERVATION TYPE SERVICE

(75) Inventors: Bo Yang, Shenzhen (CN); Zhiwei Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 424 days.

(21) Appl. No.: 13/698,970

(22) PCT Filed: Oct. 8, 2010

(86) PCT No.: PCT/CN2010/077601
§ 371 (c)(1), (2), (4) Date: Nov. 19, 2012

(87) PCT Pub. No.: WO2011/143889
PCT Pub. Date: Nov. 24, 2011

(65) Prior Publication Data
US 2013/0064085 A1 Mar. 14, 2013

(30) Foreign Application Priority Data
May 20, 2010 (CN) .......................... 2010 1 0189390

(51) Int. Cl.
| | |
|---|---|
| *H04L 12/913* | (2013.01) |
| *H04W 4/00* | (2009.01) |
| *H04L 12/911* | (2013.01) |
| *H04W 28/26* | (2009.01) |

(52) U.S. Cl.
CPC ................. *H04W 4/00* (2013.01); *H04L 47/72* (2013.01); *H04W 28/26* (2013.01)

(58) Field of Classification Search
USPC ................... 370/230, 230.1, 231–234, 395.2, 370/395.21
See application file for complete search history.

(56) References Cited

U.S. PATENT DOCUMENTS 8,112,800 B1 * 2/2012 Yang et al. ...................... 726/22
2002/0186661 A1 * 12/2002 Santiago et al. .............. 370/252
(Continued)

FOREIGN PATENT DOCUMENTS

| CN | 101110681 A | 1/2008 |
|---|---|---|
| CN | 101132325 A | 2/2008 |

(Continued)

OTHER PUBLICATIONS

International Search Report mailed on Feb. 24, 2011 in PCT/CN2010/077601 in 3 pages.
(Continued)

*Primary Examiner* — Hoon J Chung
(74) *Attorney, Agent, or Firm* — Knobbe, Martens, Olson & Bear LLP

(57) ABSTRACT

The disclosure provides a method, an apparatus and a system for processing a non-resource-reservation type service, wherein the method for processing the non-resource-reservation type service comprises: acquiring a service type of a received non-resource-reservation type service; according to the service type, querying a Network Attachment Control Function (NACF) entity about parameter information of the non-resource-reservation type service; generating a control strategy according to a present usage state of an interactive resource and the parameter information; according to the generated control strategy, controlling the received non-resource-reservation type service. The disclosure solves the problem that the non-resource-reservation type service cannot be admission-controlled in the Next Generation Network (NGN) of the prior art, and can efficiently use resources.

10 Claims, 4 Drawing Sheets

(56) References Cited

U.S. PATENT DOCUMENTS

| | | |
|---|---|---|
| 2008/0307081 A1 | 12/2008 | Dobbins et al. |
| 2009/0042537 A1 | 2/2009 | Gelbman et al. |
| 2009/0100179 A1 | 4/2009 | Song et al. |
| 2009/0296613 A1* | 12/2009 | Kahn et al. ............ 370/310 |

FOREIGN PATENT DOCUMENTS

| | | |
|---|---|---|
| CN | 101136864 A | 3/2008 |
| EP | 2 037 637 A1 | 3/2009 |
| EP | 2 045 974 A1 | 4/2009 |
| KR | 20050047252 A | 5/2005 |

OTHER PUBLICATIONS

Dong Sun Lucent Technologies USA Xin Chang Huawei Technologies Co et al: "Ouput—Draft Recommendation Y. RACF (Y.2111) Revision 2 (Version 0.1.s); 117 (WP 4/13)", ITU-T Draft; Study Period 2009-2012, International Telecommunication Union, Geneva; CH, vol. 4/13, Apr. 29, 2010, pp. 1-176.

Editor: "Updated draft ITU-T Recommendation Y.dpireq a Requirements of DPI in packet-based networks and NGN environment", ITU-T Draft; Study Period 2009-2012, International Telecommunication Union, Geneva; CH, vol. 17/13, Nov. 16, 2009, pp. 1-25.

"NGN Functional Architecture; Resource and Admission Control Subsystems (RACS); Release 1; Draft ETSI ES 2XX XXX", IEEE, Lis. Sophia Antipolis Cedex, France, No. V 1.5.0, Jan. 1, 2005 in 42 pages.

ZTE Corporation China: "DPI usage modes in NGN environment; C 628", ITU-T Draft; Study Period 2009-2012, International Telecommunication Union, Geneva; CH, vol. 17/13, Apr. 13, 2010, pp. 1-5.

Extended European Search Report for Application No. 10851646.9, dated Jul. 16, 2014, in 10 pages.

* cited by examiner

METHOD, APPARATUS AND SYSTEM FOR PROCESSING NON-RESOURCE RESERVATION TYPE SERVICE

CROSS-REFERENCE TO RELATED APPLICATIONS

This application is the U.S. National Phase application under 35 U.S.C. §371 of International Application PCT/CN2010/077601, filed Oct. 8, 2010, which claims priority to Chinese Application 201010189390.3, filed May 20, 2010.

FIELD OF THE INVENTION

The disclosure relates to the communication field, and more particularly to a method, an apparatus and a system for processing a non-resource-reservation type service.

BACKGROUND OF THE INVENTION

At present, a Next Generation Network (NGN), which applies an Internet Protocol (IP) packet technology as its bearer network technology and integrates fixed communication and mobile communication, is able to provide rich multimedia services, e.g. emerging services (IP television (IPTV), video conference, multimedia distance education, and Video on Demand (VOD) etc.) with real-time requirement. These services require the capability of a communication network to support efficient end-to-end Quality of Service (QoS). An NGN framework solves QoS problems by the following mechanisms.

FIG. 1 shows a framework announced by an International Telecommunication Union (ITU). A Policy Decision Function Entity (PD-FE) makes an initial QoS resource decision based on media stream session information (acquired from a Service Control Function (SCF) entity) and user transport resource subscription information (acquired from a Network Attachment Control Function (NACF) entity), interacts with a Transport Resource Control Function Entity (TRC-FE) subsequently to confirm whether there are sufficient QoS resources, makes a final decision eventually, and delivers the final decision to a Policy Execute Function Entity (PE-FE) which executes the final decision.

The TRC-FE, which is mainly responsible for controlling resources, monitors resources in a network, acquires related information and responds according to specific resource conditions when the PD-FE requests a resource.

The PE-FE is mainly configured to, with the guidance of the PD-FE, perform strategy control (gating control, bandwidth, traffic classification and labelling, traffic shaping, two-layer and three-layer QoS mapping, acquisition and reporting of resource usage information etc.).

According to a current Transport Resource Execute Function Entity (TRE-FE) protocol description, a transport technology-related two-layer strategy is executed with the guidance of the TRC-FE, but the specific functions and scope are undetermined.

A Deep Packet Inspection (DPI) module, which is provided with capabilities comprising user identification, service identification, QoS marker identification, and content identification etc., is able to realize flow management and strategy management based on user terminal identifier information and information comprising IP addresses and service types etc.

Currently, during the NGN applications, a resource and admission control sub-system is responsible for resource reservation and admission control of resource-reservation type services in the NGN, while best-effort services (non-resource-reservation type services) are not managed by the RAC sub-system. Therefore, non-resource-reservation type services cannot be admission-controlled in the current NGN framework.

SUMMARY OF THE INVENTION

The disclosure is put forward to solve the problem that non-resource-reservation type services cannot be admission-controlled in the NGN of the prior art. Therefore, the disclosure provides a method, an apparatus and a system for processing a non-resource-reservation type service.

A method for processing a non-resource-reservation type service is provided according to an aspect of the disclosure, comprising: acquiring a service type of a received non-resource-reservation type service; according to the service type, querying a Network Attachment Control Function (NACF) entity about parameter information of the non-resource-reservation type service; generating a control strategy according to a present usage state of an interactive resource and the parameter information; and controlling the received non-resource-reservation type service according to the generated control strategy.

Preferably, the parameter information comprises at least one of the followings: subscription information and Quality of Service (QoS) strategy information.

Preferably, before the step of acquiring the service type of the received non-resource-reservation type service, the method further comprises: acquiring an identifier of the non-resource-reservation type service; and determining whether a received service is provided with the identifier; if so, performing the step of acquiring the service type of the received non-resource-reservation type service.

Preferably, the step of generating the control strategy according to the present usage state of the interactive resource and the parameter information and the step of controlling the received non-resource-reservation type service according to the generated control strategy are performed by a Deep Packet Inspection (DPI) entity.

An apparatus for processing a non-resource-reservation type service is provided in another aspect of the disclosure, comprising: a first acquiring module configured to acquire a service type of a received non-resource-reservation type service; a querying module configured to, according to the service type, query a Network Attachment Control Function (NACF) entity about parameter information of the non-resource-reservation type service; a generating module configured to generate a control strategy according to a present usage state of an interactive resource and the parameter information; and a control module configured to control the received non-resource-reservation type service according to the generated control strategy.

Preferably, the parameter information comprises at least one of the followings: subscription information and Quality of Service (QoS) strategy information.

Preferably, the apparatus further comprises: a second acquiring module configured to, before acquiring the service type of the received non-resource-reservation type service by the first acquiring module, acquire an identifier of the non-resource-reservation type service; a determining module configured to determine whether a received service is provided with the identifier; and a notifying module configured to, when the received service is provided with the identifier, notify the first acquiring module to perform the step of acquiring the service type of the received non-resource-reservation type service.

A system for processing a non-resource-reservation type service is provided according to still another aspect of the disclosure, the system comprises: a Deep Packet Inspection (DPI) strategy managing apparatus, coupled with a Network Attachment Control Function (NACF) entity and a Policy Decision Function Entity (PD-FE) entity and configured to acquire a service type of a received non-resource-reservation type service, query the NACF entity about parameter information of the non-resource-reservation type service, generate a control strategy according to a present usage state of an interactive resource and the parameter information; a DPI control apparatus, coupled with the DPI strategy managing apparatus and configured to receive the control strategy sent by the DPI strategy managing apparatus, and control the received non-resource-reservation type service according to the control strategy.

Preferably, the DPI strategy managing apparatus comprises: a first acquiring module configured to acquire the service type of the received non-resource-reservation type service; a querying module configured to, according to the service type, query the NACF entity about the parameter information of the non-resource-reservation type service, wherein the parameter information comprises at least one of the followings: subscription information and Quality of Service (QoS) strategy information; and a generating module configured to generate the control strategy according to the present usage state of the interactive resource and the parameter information.

Preferably, the DPI strategy managing apparatus further comprises: a second acquiring module configured to, before acquiring the service type of the received non-resource-reservation type service by the first acquiring module, acquire an identifier of the non-resource-reservation type service; a determining module configured to determine whether a received service is provided with the identifier; and a notifying module configured to, when the received service is provided with the identifier, notify the first acquiring module to perform the step of acquiring the service type of the received non-resource-reservation type service.

The disclosure has the following beneficial effects:

1) by using the control strategy, the NGN network is able to control the non-resource-reservation type service;

2) since the control strategy is generated according to the related parameter information stored on the NACF entity and the present usage state of the interactive resource, the control strategy accords with the present resource usage state and the resources can be used more efficiently.

Other features and advantages of the disclosure will be described in the following description and partly become obvious from the description, or be understood by implementing the disclosure. The objects and other advantages of the disclosure can be realized and obtained through the structures indicated by the description, claims and drawings.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The disclosure will be described in details below with reference to the accompanying drawings and in combination with the embodiments. It should be noted that, if there is no conflict, the embodiments of the disclosure and the characteristics in the embodiments can be combined with one another.

Figure 1:
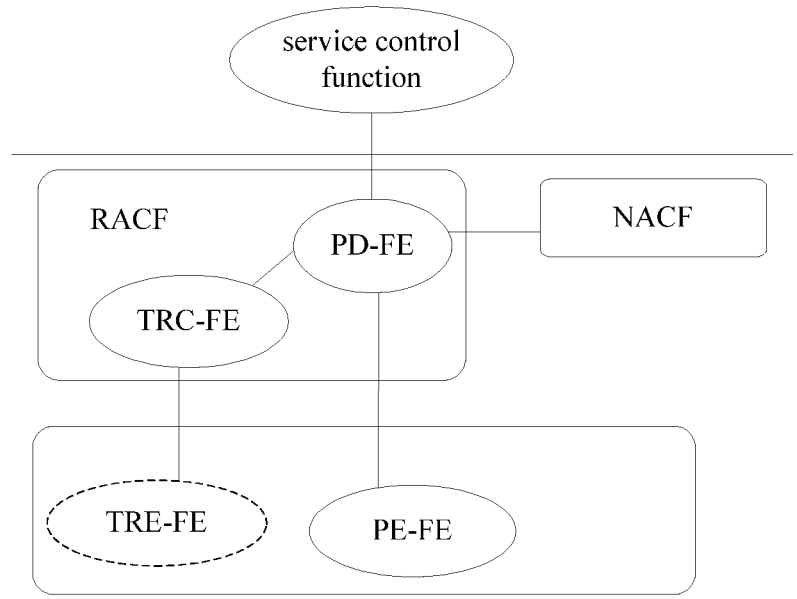
FIG. 1 is a schematic diagram illustrating an NGN network framework according to the prior art.
Figure 2:
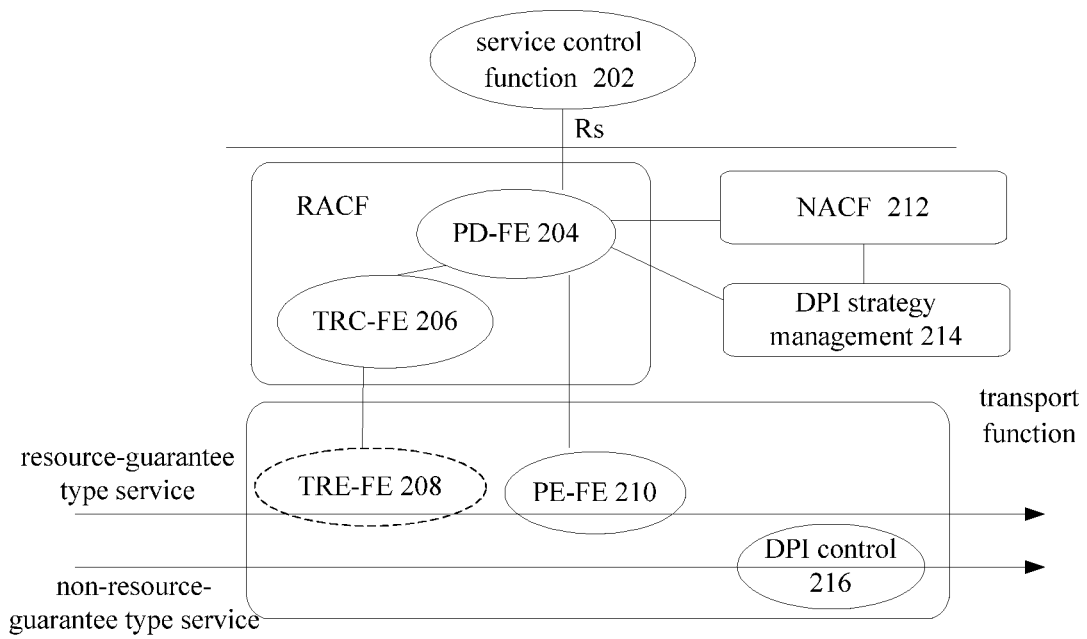
FIG. 2 is a schematic diagram illustrating an NGN network framework according to an embodiment of the disclosure.

FIG. 2 is a schematic diagram illustrating an NGN network framework according to an embodiment of the disclosure. As shown in FIG. 2, the NGN network framework (also called an NGN system in the present embodiment) comprises: an SCF 202, a PD-FE 204, a TRC-FE 206, a TRE-FE 208, a PE-FE 210 and an NACF 212. Preferably, the entities can have the same functions and connection relations as the NGN network framework as shown in FIG. 1.

Different from the NGN network framework as shown in FIG. 1, the NGN system in the present embodiment further comprises: a DPI strategy managing apparatus 214 and a DPI control apparatus 216. In the present embodiment, a system for processing a non-resource-reservation type service comprises: a DPI strategy managing apparatus 214 and a DPI control apparatus 216.

The DPI strategy managing apparatus 214 is coupled with the NACF 212 and the PD-FE 204. An interface is set for the DPI strategy managing apparatus 214 and a Resource Access Control Facility (RACF) for interacting usage states of resource-guarantee type services and non-resource-guarantee type services. An interface is set between the DPI strategy managing apparatus 214 and the NACF 212 for the DPI strategy managing apparatus 214 to query the NACF 212 about subscription information of a non-resource-reservation type service. In a working state, the DPI strategy managing apparatus 214 acquires a service type of a received non-resource-reservation type service, queries the NACF 212 about parameter information of the non-resource-reservation type service and then generates a control strategy according to a present usage state of an interactive resource and the parameter information. In the present embodiment, as an optional method, the service type of the non-resource-reservation type service can also be identified and sent to the DPI strategy managing apparatus 214 by the DPI control apparatus 216.

The DPI control apparatus 216 is coupled with the DPI strategy managing apparatus 214. In the working state, the DPI control apparatus 216 receives the control strategy sent by the DPI strategy managing apparatus 214 and controls the received non-resource-reservation type service according to the control strategy.

In the present embodiment, by using the control strategy, the NGN network is able to control the non-resource-reservation type service. In addition, since the control strategy is generated according to the related parameter information stored on the NACF entity and the present usage state of the interactive resource, the control strategy accords with the present resource usage state and resources can be used more efficiently.

Preferably, the DPI strategy managing apparatus 214 comprises: a first acquiring module configured to acquire the service type of the received non-resource-reservation type service; a querying module configured to, according to the service type, query the NACF entity about the parameter information of the non-resource-reservation type service, wherein the parameter information comprises at least one of the followings: subscription information and QoS strategy information; a generating module configured to generate the control strategy according to the present usage state of the interactive resource and the parameter information.

Preferably, the DPI strategy managing apparatus 214 further comprises: a second acquiring module configured to, before acquiring the service type of the received non-resource-reservation type service by the first acquiring module, acquire an identifier of the non-resource-reservation type service; a determining module configured to determine whether a received service is provided with the identifier; and a notifying module configured to, when the received service is provided with the identifier, notify the first acquiring module to perform the step of acquiring the service type of the received non-resource-reservation type service.

By using such a method, a corresponding step is performed only when the received service is a non-resource-reservation type service so as to control the non-resource-reservation type service, and the step is not performed when the received service is not a non-resource-reservation type service, thus simplifying the process and increasing the operation efficiency.

In the present embodiment, services carried in the NGN network are classified into resource-guarantee type services (also called resource-reservation type services in the present embodiment) and non-resource-guarantee type services (also called non-resource-reservation type services in the present embodiment). Generally, the resource-guarantee type services are session type services, e.g. Voice over Internet Protocol (VoIP), VOD and IPTV etc.; while the non-resource-guarantee type services are best-effect services, e.g. Peer-to-Peer (P2P) type downloading services comprising Point-to-Point Protocol over Ethernet (PPPOE) network accessing services, and Skype etc. In the NGN system of the present embodiment, a resource and admission control sub-system is responsible for resource reservation and admission control of the session type services, while resources of the best-effort services (non-resource-reservation type services) are controlled and managed by the DPI strategy managing apparatus 214 and the DPI control apparatus 216.

Figure 3:
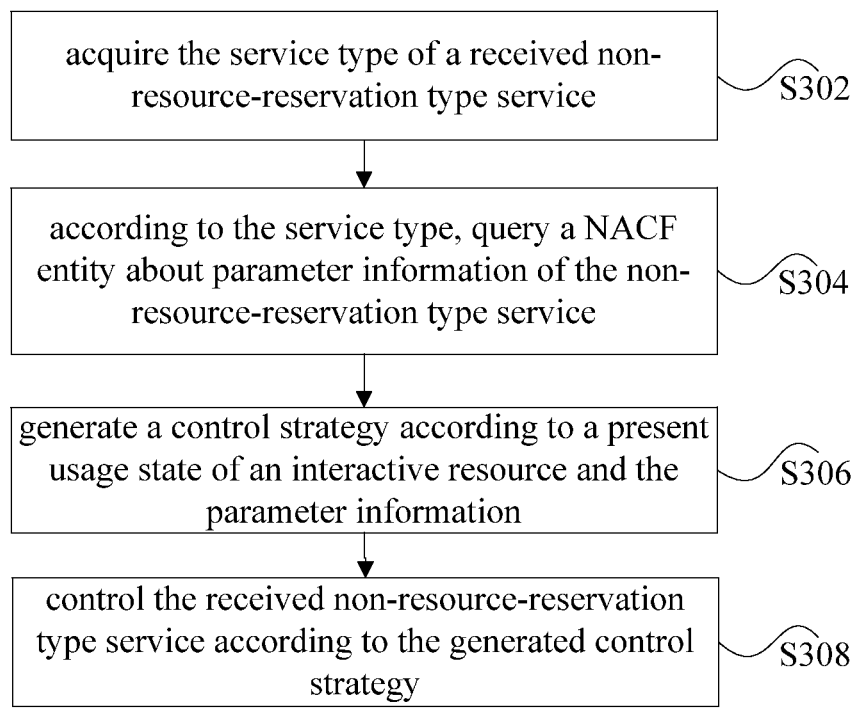
FIG. 3 is a preferred flowchart of a method for processing a non-resource-reservation type service according to an embodiment of the disclosure.

An embodiment of the disclosure provides a method for processing a non-resource-reservation type service. Preferably, the apparatus for processing the non-resource-reservation type service is applied to the NGN network in the present embodiment. FIG. 3 is a flowchart of a method for processing a non-resource-reservation type service according to an embodiment of the disclosure. As shown in FIG. 3, the method for processing the non-resource-reservation type service comprises the following steps:

S302: acquire a service type of a received non-resource-reservation type service;

S304: according to the service type, query an NACF entity about parameter information of the non-resource-reservation type service.

S306: generate a control strategy according to a present usage state of an interactive resource and the parameter information; and S308: control the received non-resource-reservation type service according to the generated control strategy.

In the present embodiment of the disclosure, by generating the control strategy, the NGN network is able to control the non-resource-reservation type service. In addition, since the control strategy is generated according to the related parameter information stored on the NACF entity and the present usage state of the interactive resource, the control strategy accords with the present resource usage state and resources can be used more efficiently.

Preferably, the parameter information comprises at least one of the followings: subscription information and QoS strategy information.

Preferably, before acquiring the service type of the received non-resource-reservation type service, the method further comprises: acquire an identifier of the non-resource-reservation type service; determine whether a received service is provided with the identifier; if so, perform the step of acquiring the service type of the received non-resource-reservation type service.

By using such a method, a corresponding step is performed only when a received service is a non-resource-reservation type service so as to control the non-resource-reservation type service, and the step is not executed when the received service is not a non-resource-reservation type service, thus simplifying the process and increasing the operation efficiency.

Preferably, the step of generating the control strategy according to the present usage state of the interactive resource and the parameter information and the step of controlling the received non-resource-reservation type service according to the generated control strategy are performed by a DPI entity.

In the present embodiment, the DPI entity comprises a DPI strategy managing apparatus and a DPI control apparatus (as shown in FIG. 2), wherein the DPI strategy managing apparatus is configured to generate the control strategy according to the present usage state of the interactive resource and the parameter information, and the DPI control apparatus is configured to control the received non-resource-reservation type service according to the generated control strategy.

In the present embodiment, as an optional method, the DPI control apparatus can also identify the service type of the non-resource-reservation type service and send the service type to the DPI strategy managing apparatus.

In the present embodiment, using the DPI entity to perform the step of generating the control strategy according to the present usage state of the interactive resource and the parameter information and the step of controlling the received non-resource-reservation type service according to the generated control strategy is only an embodiment of the disclosure, and the disclosure is not limited thereby. Other entities capable of identifying and processing the non-resource-reservation type service also can be used to perform the above steps.

Figure 4:
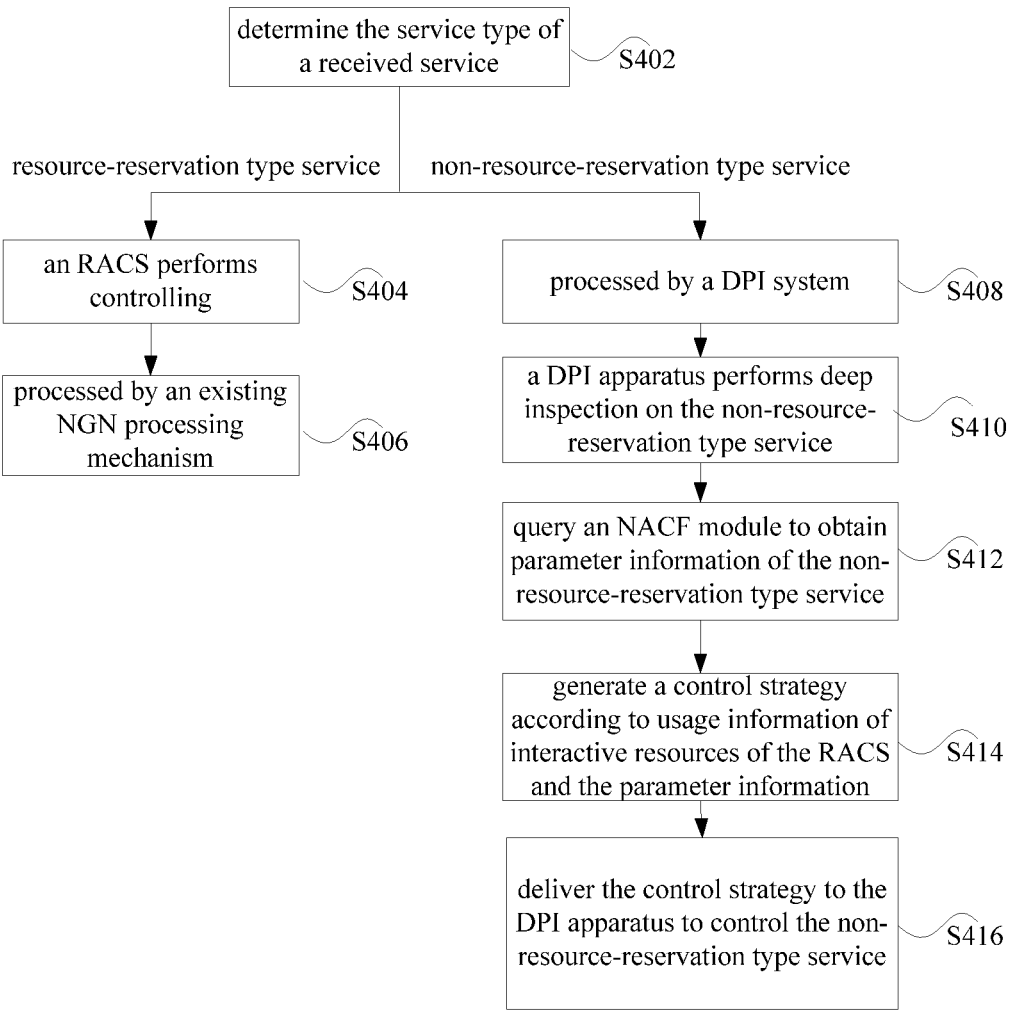
FIG. 4 is a preferred flowchart of a service processing method according to an embodiment of the disclosure.

FIG. 4 is a preferred flowchart of a service processing method based on NGN according to an embodiment of the disclosure. As shown in FIG. 4, the service processing method based on the NGN according to the embodiment of the disclosure comprises the following steps.

S402: determine a type of a received service, wherein services in the NGN are classified into resource-reservation type services and non-resource-reservation type services. If it is determined that the received service is a resource-reservation type service, turn to S404, and if it is determined that the received service is a non-resource-reservation type service, turn to S408.

S404: controlling is performed by a Resource and Admission Control System (RACS).

S406: the non-resource-reservation type service is processed by an existing NGN processing mechanism and the resource-reservation type service is controlled by a PE-FE.

S408: processing is performed by a DPI system.

S410: a DPI apparatus performs deep inspection on the non-resource-reservation type service, e.g. the service is identified to be of a service type of P2P or File Transfer Protocol (FTP) etc. In the present embodiment, as an optional method, the service type of the non-resource-reservation type service can also be identified by a DPI strategy managing module.

S412: the DPI strategy managing module, according to the identified service, queries an NACF module to obtain parameter information of the non-resource-reservation type service, e.g. the parameter information comprises: subscription information and QoS strategy information etc.

S414: the DPI strategy managing module generates a control strategy according to usage information of interactive resources of the RACS and the parameter information.

S416: the DPI strategy managing module delivers the control strategy to the DPI apparatus to perform service control for the non-resource-reservation type service.

Figure 5:
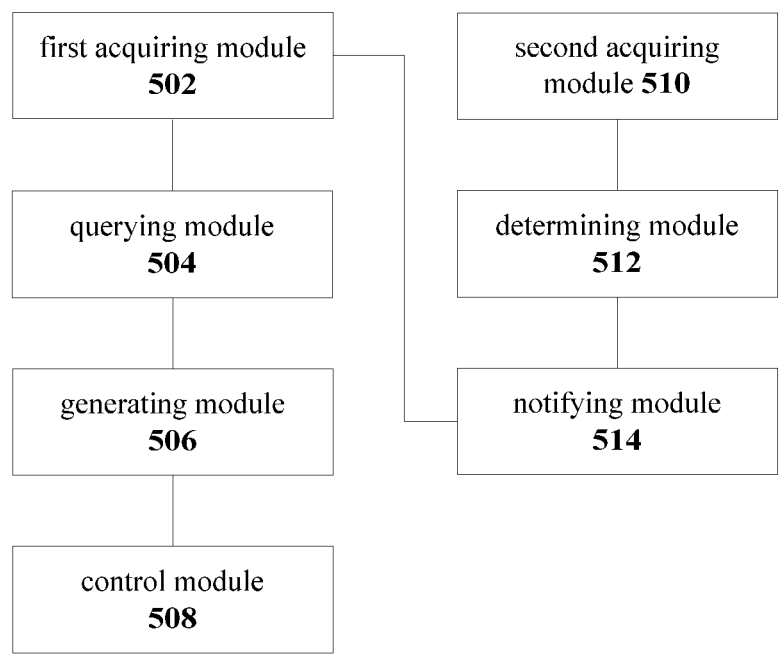
FIG. 5 is a schematic diagram illustrating an apparatus for processing a non-resource-reservation type service according to an embodiment of the disclosure.

An embodiment of the disclosure provides an apparatus for processing a non-resource-reservation type service. Preferably, the apparatus for processing the non-resource-reservation type service is applied to an NGN network. As shown in FIG. 5, the NGN-based apparatus for processing the non-resource-reservation type service according to the embodiment of the disclosure comprises: a first acquiring module 502, a querying module 504, a generating module 506 and a control module 508.

In a working state, the first acquiring module 502 acquires a service type of a received non-resource-reservation type service; subsequently, according to the service type, the querying module 504 queries an NACF entity about parameter information of the non-resource-reservation type service; then the generating module 506 generates a control strategy according to a present usage state of an interactive resource and the parameter information; and then the control module 508, according to the generated control strategy, controls the received non-resource-reservation type service.

In the present embodiment, by using the control strategy, the NGN network is able to control the non-resource-reservation type service. In addition, since the control strategy is generated according to the related parameter information stored on the NACF entity and the present usage state of the interactive resource, the control strategy accords with the present resource usage state and resources can be used more efficiently.

Preferably, the parameter information comprises at least one of the followings: subscription information and QoS strategy information.

Preferably, the apparatus for processing the non-resource-reservation type service according to the embodiment of the disclosure further comprises: a second acquiring module 510 configured to, before acquiring the service type of the received non-resource-reservation type service by the first acquiring module, acquire an identifier of the non-resource-reservation type service; a determining module 512 configured to determine whether a received service is provided with the identifier; and a notifying module 514 configured to, when the received service is provided with the identifier, notify the first acquiring module 502 to perform the step of acquiring the service type of the received non-resource-reservation type service.

By using such a method, a corresponding step is performed only when a received service is a non-resource-reservation type service so as to control the non-resource-reservation type service, and the step is not executed when the received service is not a non-resource-reservation type service, thus simplifying the process and increasing the operation efficiency.

It should be noted that, the steps illustrated in the flowcharts of the accompanying drawings can be implemented by computer systems such as a group of commands executable by computers. In addition, although logical sequences have been illustrated in the flowcharts, the steps as illustrated or described herein can be implemented according to sequences different from the sequences here in some cases.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A method for processing a non-resource-reservation type service,
   wherein the method is applied in a next generation network (NGN) comprising a service control function (SCF), a Policy Decision Function Entity (PD-FE), a Transport Resource Control Function Entity (TRC-FE), a Transport Resource Execute Function Entity (TRE-FE), a Policy Execute Function Entity (PE-FE), a Network Attachment Control Function (NACF), a DPI strategy managing apparatus and a DPI control apparatus, wherein the DPI strategy managing apparatus is coupled with the NACF and the PD-FE, and the method comprises:
   the DPI control apparatus identifying a service type of the non-resource-reservation type service and sending the service type of the non-resource-reservation type service to the DPI strategy managing apparatus;
   according to the service type, the DPI strategy managing apparatus querying the NACF entity about parameter information of the non-resource-reservation type service;
   the DPI strategy managing apparatus generating a control strategy according to a present usage state of an interactive resource and the parameter information, wherein the present usage state of the interactive resource is acquired by the DPI strategy managing apparatus from a Resource Access Control Facility (RACF); and
   the DPI control apparatus receiving the generated control strategy from the DPI strategy managing apparatus and controlling the received non-resource-reservation type service according to the generated control strategy.

2. The method according to claim 1, wherein the parameter information comprises at least one of the followings: subscription information and Quality of Service (QoS) strategy information.

3. The method according to claim 1, wherein before the step of acquiring the service type of the received non-resource-reservation type service, the method further comprises:
   acquiring an identifier of the non-resource-reservation type service; and determining whether a received service is provided with the identifier;

if so, performing the step of acquiring the service type of the received non-resource-reservation type service.

4. The method according to claim 1, wherein the step of generating the control strategy according to the present usage state of the interactive resource and the parameter information and the step of controlling the received non-resource-reservation type service according to the generated control strategy are performed by a Deep Packet Inspection (DPI) entity.

5. A system for processing a non-resource-reservation type service, wherein the system is applied in a next generation network (NGN) comprising a service control function (SCF), a Policy Decision Function Entity (PD-FE), a Transport Resource Control Function Entity (TRC-FE), a Transport Resource Execute Function Entity (TRE-FE), a Policy Execute Function Entity (PE-FE), and a Network Attachment Control Function (NACF), wherein the system comprises a DPI strategy managing apparatus and a DPI control apparatus, and wherein the DPI strategy managing apparatus is coupled with the NACF and the PD-FE, wherein the DPI control apparatus is configured to identify the service type of the non-resource-reservation type service and send the service type of the non-resource-reservation type service to the DPI strategy managing apparatus; and wherein the DPI strategy managing apparatus is configured to:

receive the service type of the received non-resource-reservation type service from the DPI control apparatus;

according to the service type, query the NACF entity about parameter information of the non-resource-reservation type service; and generate a control strategy according to a present usage state of an interactive resource and the parameter information, wherein the present usage state of the interactive resource is acquired by the DPI strategy managing apparatus from a Resource Access Control Facility (RACF); and wherein the DPI control apparatus is configured to receive the generated control strategy from the DPI strategy managing apparatus and control the received non-resource-reservation type service according to the generated control strategy.

6. The system according to claim 5, wherein the parameter information comprises at least one of the followings: subscription information and Quality of Service (QoS) strategy information.

7. The system according to claim 5, wherein the DPI strategy managing apparatus or the DPI control apparatus is further configured to:

before acquiring the service type of the received non-resource-reservation type service, acquire an identifier of the non-resource-reservation type service;

determine whether a received service is provided with the identifier; and when the received service is provided with the identifier, provide a notification to acquire the service type of the received non-resource-reservation type service.

8. A system for processing a non-resource-reservation type service, wherein the system is applied in a next generation network (NGN) comprising a service control function (SCF), a Policy Decision Function Entity (PD-FE), a Transport Resource Control Function Entity (TRC-FE), a Transport Resource Execute Function Entity (TRE-FE), a Policy Execute Function Entity (PE-FE) and a Network Attachment Control Function (NACF), and the system comprises:

a Deep Packet Inspection (DPI) strategy managing apparatus, coupled with the NACF entity and the PD-FE entity and configured to receive a service type of the non-resource-reservation type service sent from a DPI control apparatus after the DPI control apparatus identifies the service type of the non-resource-reservation type service, query the NACF entity about parameter information of the non-resource-reservation type service according to the service type, generate a control strategy according to a present usage state of an interactive resource and the parameter information, wherein the present usage state of the interactive resource is acquired by the DPI strategy managing apparatus from a Resource Access Control Facility (RACF);

a DPI control apparatus, coupled with the DPI strategy managing apparatus and configured to receive the control strategy sent by the DPI strategy managing apparatus, and control the received non-resource-reservation type service according to the control strategy.

9. The system according to claim 8, wherein the DPI strategy managing apparatus is configured to:

acquire the service type of the received non-resource-reservation type service;

according to the service type, query the NACF entity about the parameter information of the non-resource-reservation type service, wherein the parameter information comprises at least one of the followings: subscription information and Quality of Service (QoS) strategy information; and generate the control strategy according to the present usage state of the interactive resource and the parameter information.

10. The system according to claim 8, wherein the DPI strategy managing apparatus or the DPI control apparatus is further configured to:

before acquiring the service type of the received non-resource-reservation type service, acquire an identifier of the non-resource-reservation type service;

determine whether a received service is provided with the identifier; and when the received service is provided with the identifier, provide a notification to acquire the service type of the received non-resource-reservation type service.

* * * * *